(12) United States Patent
Guzik et al.

(10) Patent No.: US 6,242,910 B1
(45) Date of Patent: Jun. 5, 2001

(54) MAGNETIC HEAD AND DISK TESTER WITH YAW CORRECTION

(75) Inventors: Nahum Guzik, Palo Alto; Cem Kilicci, San Francisco; Ilia M. Bokchtein, Santa Clara; Ufuk Karaaslan, Sunnyvale, all of CA (US)

(73) Assignee: Guzik Technical Enterprises, San Jose, CA (US)

( * ) Notice: Subject to any disclaimer, the term of this patent is extended or adjusted under 35 U.S.C. 154(b) by 0 days.

(21) Appl. No.: 09/241,510

(22) Filed: Feb. 1, 1999

(51) Int. Cl.[7] ............................... G11B 5/48; G11B 5/56; G11B 21/24; G01R 33/12
(52) U.S. Cl. ..................... 324/212; 324/262; 360/294.4
(58) Field of Search ............................... 324/210, 212, 324/262; 73/866.5; 360/75, 76, 290, 291.9, 292, 294.1–294.4, 294.6, 264.5

(56) References Cited

U.S. PATENT DOCUMENTS

| 4,258,398 | * | 3/1981 | Bixby et al. | 360/76 |
| 4,902,971 | * | 2/1990 | Guzik et al. | 324/212 |
| 5,382,887 | | 1/1995 | Guzik et al. | |
| 5,500,777 | * | 3/1996 | Hasegawa et al. | 360/292 X |
| 5,808,435 | | 9/1998 | Mager | 318/593 |
| 5,856,896 | * | 1/1999 | Berg et al. | |
| 5,898,541 | | 4/1999 | Boutaghou et al. | 360/109 |
| 5,998,994 | * | 12/1999 | Mori | 324/212 |

* cited by examiner

*Primary Examiner*—Gerard R. Strecker
(74) *Attorney, Agent, or Firm*—McDermott, Will & Emery (57) ABSTRACT

A magnetic head and disk tester includes a magnetic head which is selectively positioned relative to a rotatably mounted magnetic disk to accomplish testing of either of the head or disk or both. The magnetic head is secured to a carriage which is under electro-mechanical control, wherein displacement of the carriage causes a corresponding displacement of the head relative to the disk and, to some degree, may cause yaw in the carriage. Measurements of the linear position of a left and a right side of the carriage are detected, measured, and fed back to a control system. The control system responds to a difference between a desired command position and the actual position of each side of the carriage and causes actuators to adjust the position of each side of the carriage until the difference, and thereby the yaw, is substantially eliminated. Additionally, during a positioning operation, vibrations in the yaw direction are decreased, which decreases a corresponding settling time of the magnetic head.

27 Claims, 6 Drawing Sheets

MAGNETIC HEAD AND DISK TESTER WITH YAW CORRECTION

REFERENCE TO RELATED APPLICATION

This application is related to U.S. Application Ser. No. 09/241,512, entitled "Magnetic Head and Disk Tester with Pitch Correction" filed on even date herewith and assigned to the assignee of the present invention.

BACKGROUND OF THE INVENTION

The present invention relates to magnetic head and disk testers, and more particularly to testers with improved accuracy in positioning a magnetic head with respect to a disk.

A magnetic head and disk tester is an instrument that is used for testing the characteristics of magnetic heads and disks such as signal-to-noise ratio, pulse width and so on. Each tester includes two main assemblies, i.e., an electro-mechanical assembly that performs movements of the head with respect to the disk, and an electronic assembly that is responsible for measurements, calculations, and analysis of the measured data. The electro-mechanical assembly of the tester is known as the spinstand. The spinstand generally simulates the motions of the head with respect to the disk that occur in, for example, a hard disk drive. Whatever the accuracy of the electronic measurement portion of the tester, the results of measurements will also depend upon the positioning accuracy provided by the spinstand.

Figure 1A:
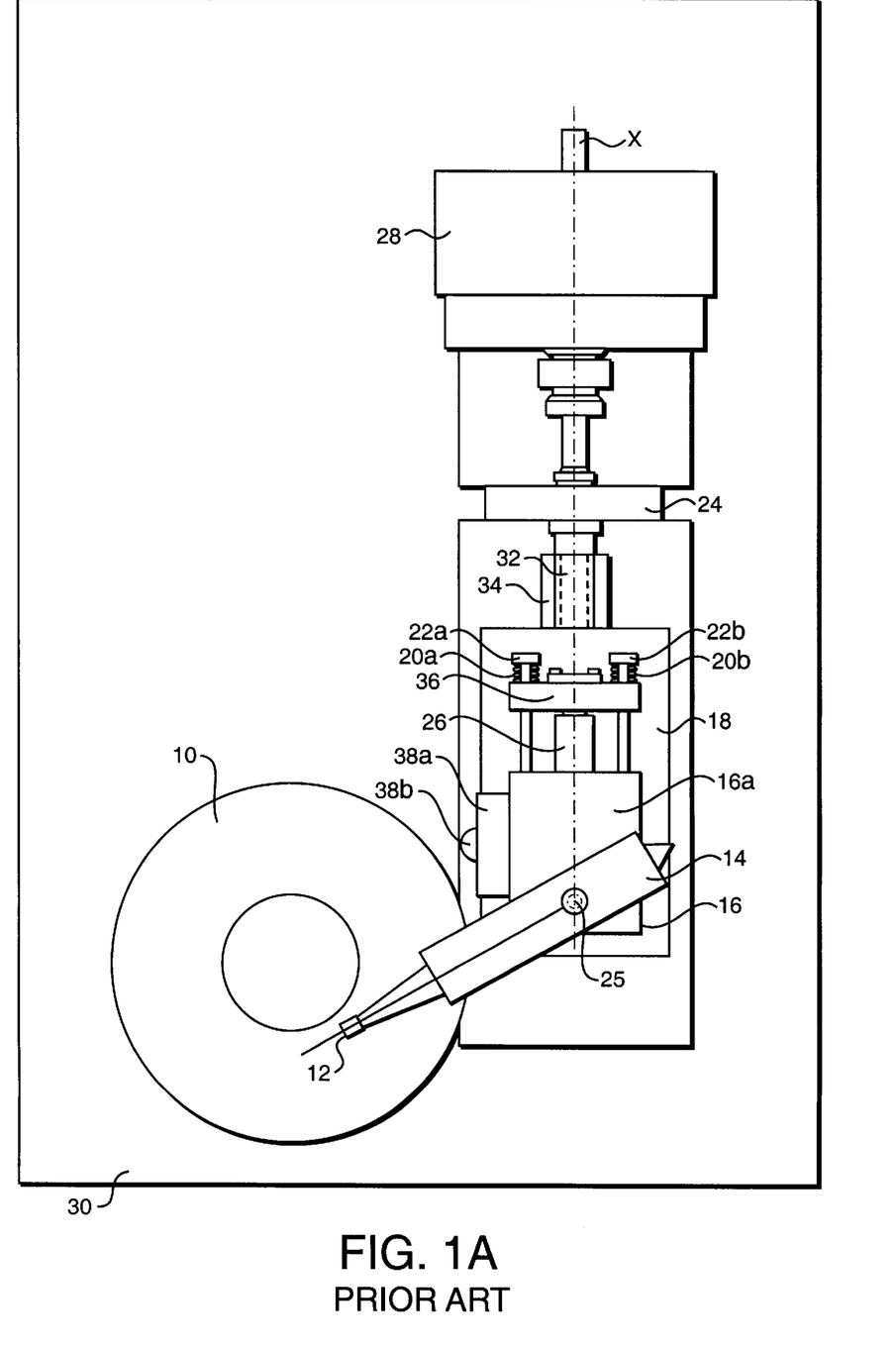
FIG. 1A is a schematic representation of a prior art spinstand used in a magnetic head and disk tester.

An exemplary spinstand 5 of a prior-art head and disk tester is shown schematically from a top view in FIG. 1A. The spinstand 5 includes a stationary base element 30 that supports the positioning system and the head 12 and disk 10 to be tested. The disk 10 is supported in a preferably horizontal plane in a manner allowing rotary motion of the disk 10 about a spindle axis perpendicular to that horizontal plane. The spinstand 5 includes a coarse positioning system and a fine positioning system arranged in series to effect controlled movement of head 12 with respect to disk 10. The coarse positioning system positions the magnetic head 12 close to its desired position relative to a magnetic disk 10. In the illustrated form, the coarse positioning system includes a stepper motor 28 affixed to base 30. The stepper motor 28 rotationally drives a lead screw 32 that rotates within bearings 24 and engages a nut 34. Nut 34 is rigidly fixed to a slide 18 so that rotary motion of lead screw 32 effects linear motion of slide 18 along guides (not shown) with respect to base element 30, along a translation axis X, or X-axis.

The fine positioning system of spinstand 5 resides on slide 18 and effects relatively minor positional changes to the position of head 12 illustrated by the slide 18. In the illustrated form, the fine positioning system includes a piezo actuator 26 that is disposed between a stop 36 that is rigidly mounted on slide 18 and a deformable (in the direction of x-axis) body 16 also mounted on slide 18. Two bolts 22a and 22b are screwed into deformable body 16 through openings in the stop 36. Piezo actuator 26 is preloaded by springs 20a, 20b that are compressed between the heads of the bolts 22a, 22b and the stop 36. The deformable body 16 at its base is rigidly coupled to slide 18. The top of body 16 is moveable, in response to the piezo actuator 26, supports arm 14, which in turn supports head 12. Arm 14 is coupled to link 16a by a shaft 25. Body 16 functions as a parallel-link mechanism that is sensitive to the expansions and contractions of piezo actuator 26 to small linear displacements (e.g., 0.001 in) for head 12, (relative to disk 10, as supported on base 30) in addition to the major displacements effected by the coarse positioning system.

Figure 1B:
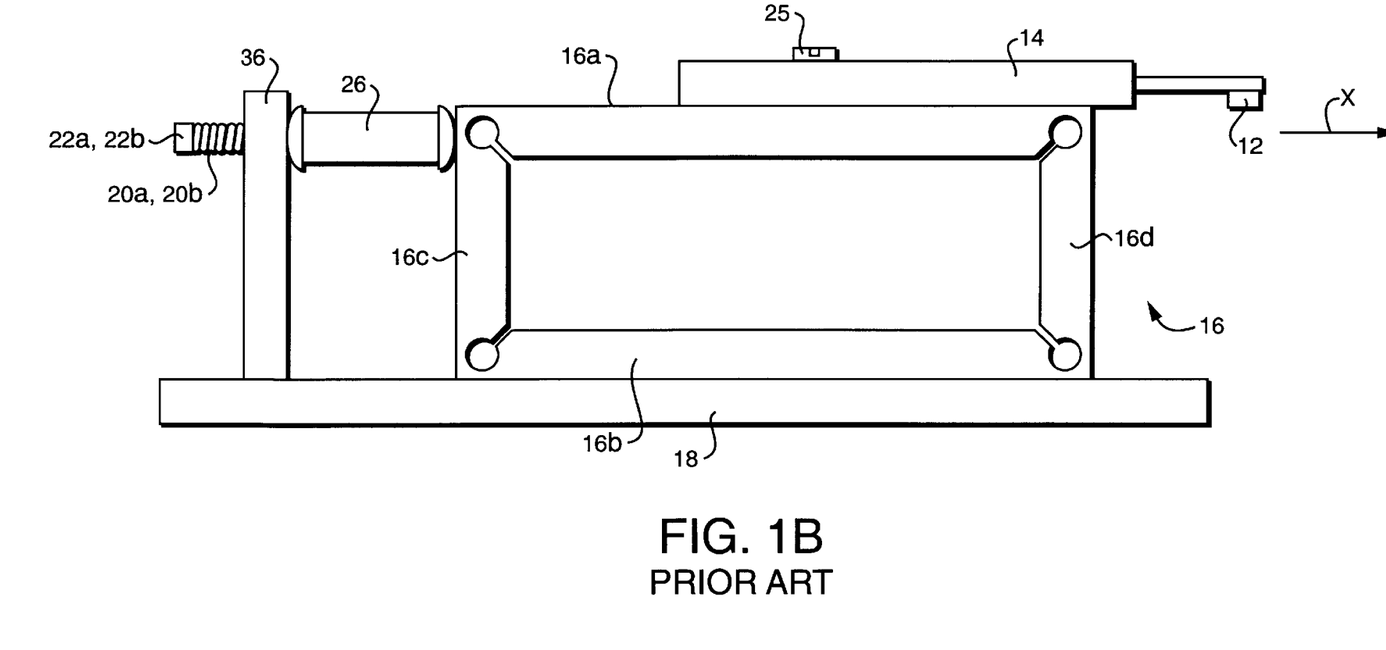
FIG. 1B is a schematic side view of the fine positioning system of a prior art spinstand of FIG. 1A.

FIG. 1B shows side view of an exemplary form of deformable body 16 in the system of FIG. 1A. In this form, the deformable body 16 is a parallelogram-structured deformable body comprised of a top and a bottom rigid links 16a and 16b, disposed in parallel, coupled by two side rigid links 16c and 16d, wherein flexures are at the junction of link pairs to allow for angular displacement of the elements while substantially maintaining the parallelogram integrity of the structure. With this structure the piezo element 26 drives the uppermost, as shown, or the top link 16a of deformable body 16 in the x direction relative to slide 18 (and base 30), whereby the magnetic head 12 to be tested remains substantially at the same height throughout the range of its displacement.

Movements of the link 16a of deformable body 16 are measured by an optical linear encoder 38a, 38b, as shown in FIG. 1A. The optical linear encoder 38 consists of a moveable portion 38a (i.e., a glass scale) that is rigidly attached to the top link 16a of deformable body 16 and a stationary portion 38b (i.e., an optical detector) fixed to base 30. A signal generated by optical detector 38b corresponds to movements of top link 16a of deformable body 16 relative to base 30. That signal corresponds to a sum of the linear displacement established by the steppers motor 28 and by the piezo actuator 34 (together with deformable body 16).

Thus, to achieve high accuracy in linear positioning of head 12 over magnetic disk 10, the positioning process is split into steps of coarse and fine positioning. The coarse positioning is provided, in part, by the rotation of lead screw 32 by stepper motor 28. Rotational movement of lead screw 32 is translated into a linear movement of slide 18 by nut 34. Upon completion of coarse positioning, fine positioning is activated by applying a voltage to piezo actuator 26 from an external power supply (not shown). In a manner known in the art, under the effect of the voltage, actuator 26 changes its linear dimension in proportion to the level of the applied voltage. As a result, the top link 16a together with arm 14 and a magnetic head 12 is shifted with respect to magnetic disk 10 in the X direction. The displacement of magnetic head 12 is measured by optical linear encoder 38 and sent to a feedback circuit (not shown) to control the amount of displacement of the deformable body 16, in a manner known in the art.

Figure 2:
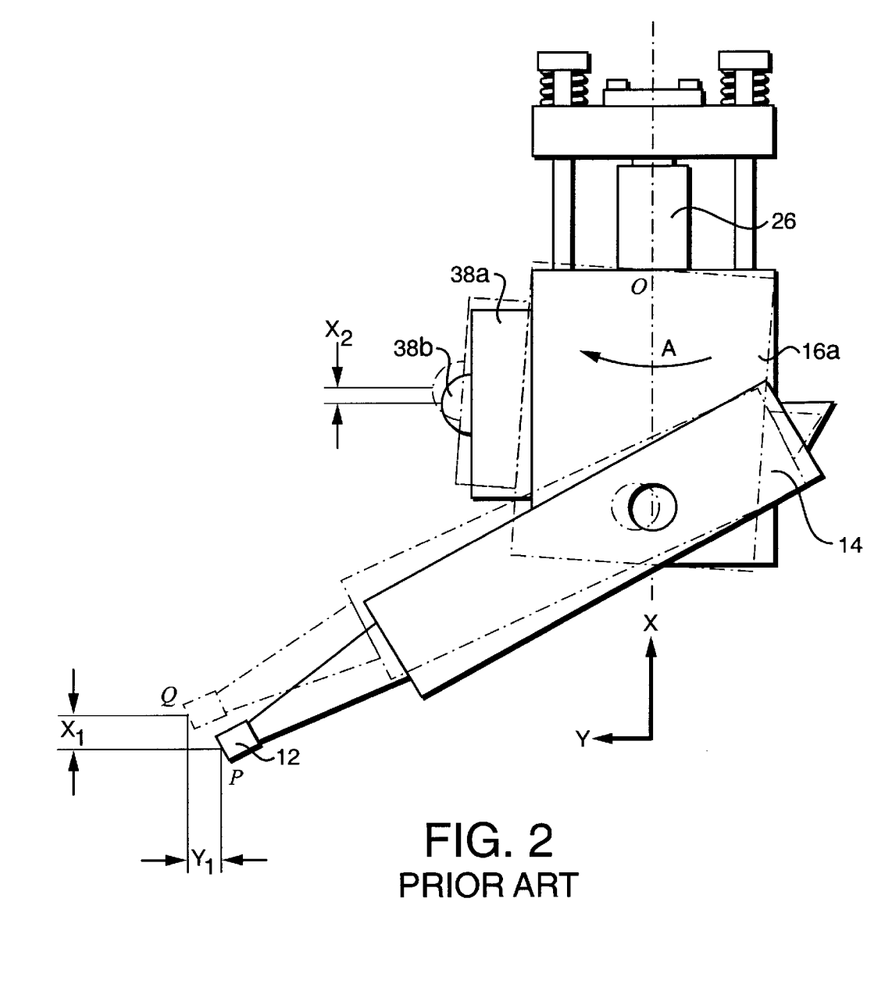
FIG. 2 is a schematic representation of the consequences of yaw in the prior art magnetic head and disk tester of FIGS. 1A and 1B.

During the testing, when the top link 16a of deformable body 16 moves arm 14 with magnetic head 12 mounted thereto, an optical linear encoder 38 is used to determine the position of magnetic head 12. In the prior art, the displacement measured by optical linear encoder 38 is considered to be substantially the same as the displacement of the magnetic head 12. However, in practice, the top link 16a of the deformable body 16 may experience yaw (i.e. rotational displacement about an axis perpendicular to the nominal (horizontal) plane of allowed movement) during the movement. Yaw can occur due to different (asymmetrical) stiffness of the weakened portions (i.e. the flexures) of the deformable body 16, or due to different stiffnesses of the springs 20a and 20b. FIG. 2 shows the effect of the parallelogram-structured deformable body 16 rotating about a point O in the direction indicated by arrow A. As shown, the head 12 moves from an original point P to a point Q. This movement corresponds to a shift $X_1$ in the X direction, and to a shift $Y_1$, in the Y direction. Optical linear encoder 38a, 38b can only detect movements in the X direction; in this particular case, it detects, a movement of $X_2$, which is not equal to $X_1$. The difference $X_1$–$X_2$ and the shift $Y_1$, cannot be compensated by the normal, prior art feedback circuit, since the yaw component is undetectable. Therefore, the prior art spinstand 5 shown in FIGS. 1A and 1B cannot achieve very high positioning accuracy.

This problem of accuracy is solved to some degree in a prior art disk and head tester designated as Model 1701, developed and manufactured by Guzik Technical Enterprises, San Jose, Calif. This tester uses a high-precision micropositioning mechanism that performs fine movements. Although this mechanism operates very efficiently and is advantageous for some applications, it is expensive to manufacture because it requires the use of many interacting parts, relative to, for example, the tester of FIGS. 1A, 1B, and 2.

Another disadvantage of the prior art spinstand shown in FIGS. 1A, 1B, and 2 is that the parallelogram-structured deformable body 16, the arm 14, and the head 12 tend to oscillate in the direction indicated by arrow A when the piezo actuator 26 changes its length. The reason for this is that the center of mass of the combination consisting of deformable body 16, arm 14, and magnetic head 12 is not on the longitudinal axis of piezo actuator 26. As a result, this configuration increases the settling time of magnetic head 12 (the time that is necessary to move magnetic head 12 from one point to another).

It is, accordingly, an object of the present invention to provide a magnetic head and disk tester, with relatively few parts, that ensures high accuracy of positioning of a magnetic head over a magnetic disk by compensating for yaw. It is yet another object of the present invention is to decrease the settling time of a head and disk tester.

SUMMARY OF THE INVENTION

According to the present invention, a magnetic head and disk tester comprises an assembly for rotationally supporting a magnetic disk (or disk) in a first plane and a dual-stage positioning system that moves in the direction of an X-axis, and a magnetic head with respect to the magnetic disk substantially within a second (or translation) plane which is parallel to the disk plane. The first stage of the positioning system is a coarse positioner that positions the magnetic head in the vicinity of a predetermined command position relative to a magnetic disk. In a preferred embodiment, the coarse positioner includes a lead screw rotated along a translation X-axis by a stepper motor which causes linear movement of a carriage which contains the second stage of the positioning system. The second stage of the positioning system is a fine positioner that comprises a deformable body in the carriage, preferably in the form of a parallelogram-structured deformable body having four flexure coupled planar links. In that preferred form, the deformable body has a top link that supports a magnetic head, and a bottom link that is rigidly connected to the slide. The top link is moveable in a plane substantially parallel to the translation plane. A pair of piezo actuators, spaced apart in the translation plane, and transverse to the x axis, are coupled between the top link and the carriage to provide controlled adjustment of the orientation of that link about axes perpendicular to the nominal translation plane. Preferably, the top link includes a left and a right side that can be independently moved in the direction of the x axis and with respect to the carriage by the two piezo actuators located behind the front link and proximate to the top link. Positions of both left and right sides of the top link of the deformable body are measured by separated optical linear encoders, one on each side. The results of these measurements are input to a closedloop positioning system with two separate feedback loops, each controlling one of the piezo actuators. By using two piezo actuators, any yaw of the deformable body and the magnetic head is eliminated, which significantly increases positioning accuracy of the magnetic head respect to the magnetic disk. Furthermore, vibrations in the yaw direction during a positioning operation are damped by the fine positioner, which decreases the settling time (the time that is necessary to move the magnetic head from one point to another) of the tester of the invention.

BRIEF DESCRIPTION OF THE DRAWINGS

The foregoing and other objects of this invention, the various features thereof, as well as the invention itself, may be more fully understood from the following description, when read together with the accompanying drawings as described below.

DETAILED DESCRIPTION OF THE PREFERRED EMBODIMENTS

Figure 3A:
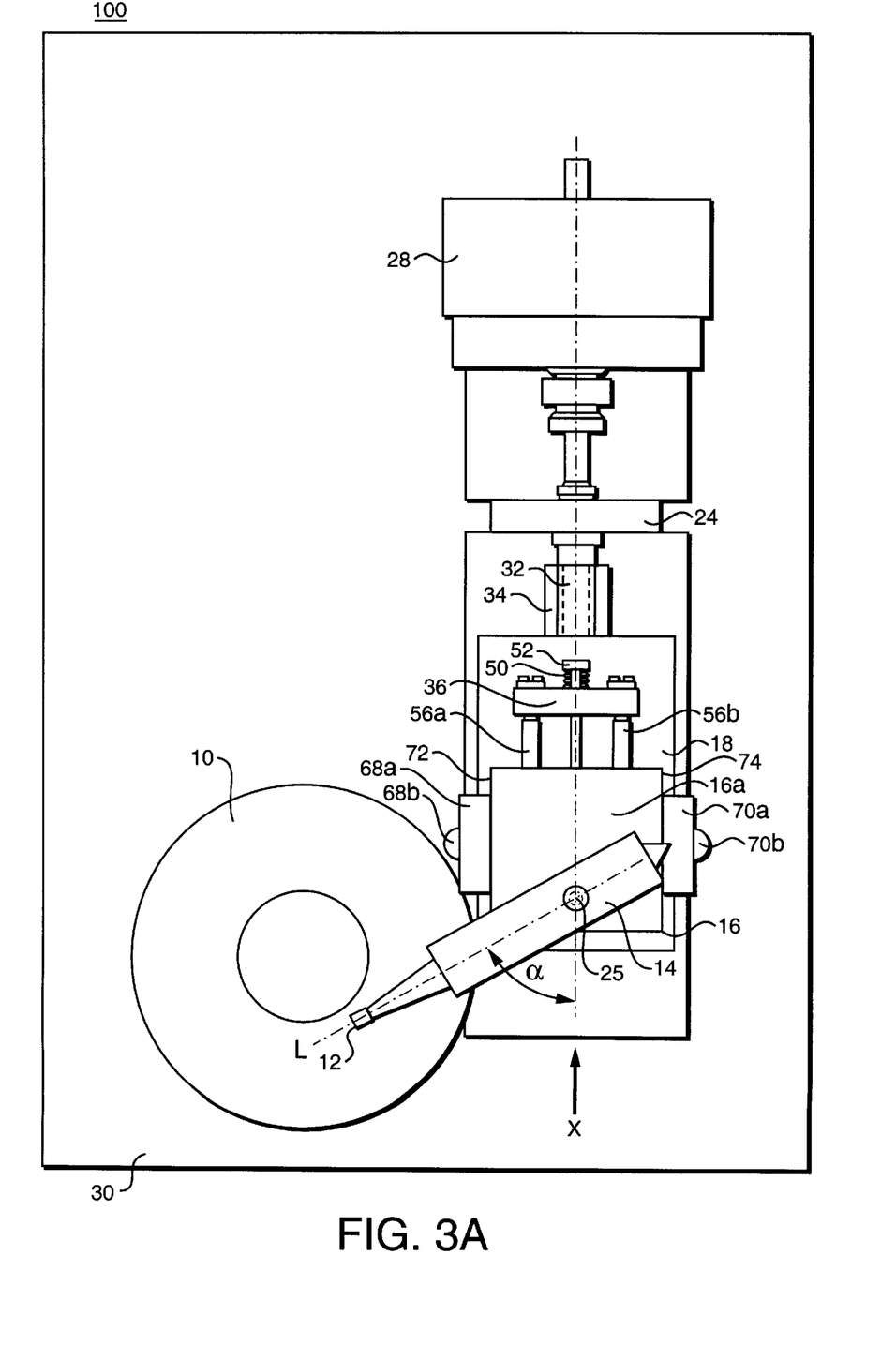
FIG. 3A is a schematic representation of the spinstand of the magnetic head and disk tester of a preferred embodiment of the present invention.

A spinstand 100 of the preferred embodiment of a magnetic head and disk tester in accordance with the present invention is schematically shown from a top view in FIG. 3A. The spinstand 100 is similar to the spinstand 5 illustrated in FIG. 1A, except that spinstand 100 includes the yaw correction assembly of the present invention. In FIG. 3A elements which corresponds to elements in FIG. 1A, are identified with the same reference designations. A magnetic disk 10 is rotationally (about a vertical axis) supported in a first (or disk) plane on a base 30 of spinstand 100. A magnetic head 12 is positioned relative to disk 10 to permit testing. Similar to the prior art tester of FIG. 1A, the spinstand 100 includes a dual-stage positioning system having a coarse positioner and a fine positioner for selectively positioning head 12 along a transition or X-axis. The coarse positioner includes base 30 that supports a stepper motor 28 which rotationally drives a lead screw 32. Stepper motor 28 is a standard commercially available module, for example a stepper motor of model ESCAP P850-508-C produced by Portescap U.S., Inc., Hauppauge, N.Y., USA. Lead screw 32 rotates within bearings 24 and engages a nut 34 that is rigidly fixed to a carriage 18, thereby being adapted for translating the rotational motion of the lead screw 32 into linear motion of the carriage 18 in the X direction. The carriage 18 moves along guides (not shown) with respect to base 30, and along the X-axis.

The fine positioner includes a four link parallelogram deformable body 16 mounted to the carriage 18, as in the embodiment of FIG. 1A. Also, as in that embodiment the magnetic head 12 is mounted to horizontally oriented arm 14, which is attached to the top link of deformable body 16 by a vertical coupler, such as shaft 25. The coarse positioner moves the fine positioner and, thereby, positions the magnetic head 12 near a predetermined command position relative to the magnetic disk 10, and the fine positioner effects minor change to that position established by the coarse positioner.

The fine positioner includes a correction mechanism for correcting yaw experienced by the top link of deformable body 16 (and the magnetic head 12).

The fine positioner of the preferred embodiment of the invention includes two piezo actuators 56a and 56b that are positioned between a stop 36, which is rigidly mounted to carriage 18, and the top link 16a of deformable body 16. The piezo actuators 56a and 56b are laterally offset from each other (about the x axis) so that each can effect a displacement of a different side of link 16a, and offset yaw. Deformable body 16 is sensitive to the expansions and contractions of piezo actuators 56a and 56b and thereby achieves fine positioning at the magnetic head 12, while eliminating yaw.

As shown, piezo actuators 56a and 56b are placed approximate to two ends (i.e., left and right) of a top link 16a of deformable body 16, and along the X-axis, such that the direction of force applied by actuators 56a and 56b is parallel to the X-axis. A bolt 52 is screwed into the center of deformable body 16 through an opening in stop 36. Piezo actuators 56a and 56b are preloaded by a spring 50 that is compressed between the head of bolt 52 and the stop 36, the stop being rigidly attached to carriage 18. In the preferred embodiment, piezo actuators 56a and 56b are standard piezoelectric devices that change their linear dimensions in response to voltage applied to their respective inputs. An example of commercially available piezo actuator is a device P-844.20 produced by Physik Instrumente (PI) GMbH, Waldbronn, Germany.

Figure 3B:
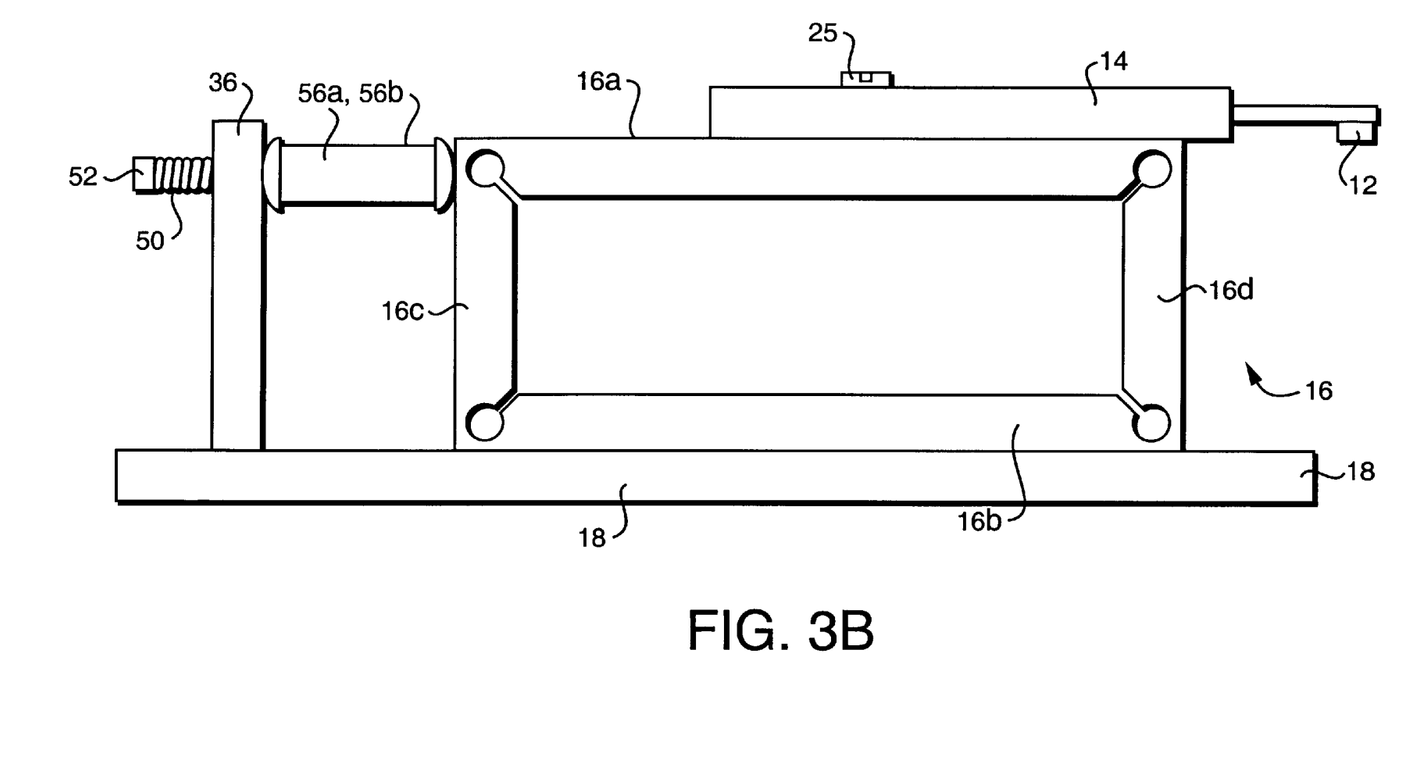
FIG. 3B is a schematic side view of the preferred embodiment of the fine positioning system of the magnetic head and disk tester of FIG. 3A.

As shown in FIG. 3B, in the preferred form of deformable body 16 is a four link (16a, 16b, 16c and 16d) parallelogram-structured deformable body 16 having a top link 16a that supports arm 14, and a bottom link 16b that is secured to carriage 18. The flexures at the vertices of the parallelogram-structure allow angular displacement of adjacent links while maintaining the parallelogram integrity of the structure. The top element 16a can be moved linearly in the x direction, and also can be selectively rotated about axes perpendicular to the translation plane using piezo actuators 56a and 56b which expand and contract independently. This selective rotation of link 16a provides a mechanism by which yaw can be corrected. Deformable body 16 also includes a bottom element 16b which rigidly attaches deformable body 16 to carriage 18. Because of the fine degree of movement caused by piezo actuators 56a and 56b and the parallelogram-structure of deformable body 16, the top link 16a remains substantially in a plane parallel to the translation plane throughout its range of displacement. Accordingly, Magnetic head 12 substantially remains in its plane throughout its range of displacement.

Referring again to FIG. 3A, linear movements of deformable body 16 along the X-axis are measured by two optical linear encoders 68a, 68b, 70a and 70b, in the preferred embodiment. These encoders consist of moveable portions 68a and 70a that are secured to the left side 72 and the right side 74, respectively, of link 16a of deformable body 16 and stationary portions 68b and 70b that are secured to base 30. The moveable portions 68a and, 70a are glass scales and the stationary portions 68b and 70b are optical detectors. Signals generated by optical detector 68b and 70b correspond to linear positions of the left side 72 and the right side 74 of the top link 16a of deformable body 16, respectively. Thus, independent signals representative of the linear displacements of the left and right sides of top link 16a are generated. Optical linear encoders 68a, 68b and 70a, 70b are standard devices, such as the encoder LIP401R produced by Heidenhain Corporation, Schaumburg, Ill. Those skilled in the art will appreciate that alternative embodiments of the present invention could use other types of devices to measure the linear displacements of the right and left sides of top link 16a, such as magnetic, electrical, or mechanical encoders or similar devices, or some combination thereof.

Figure 4:
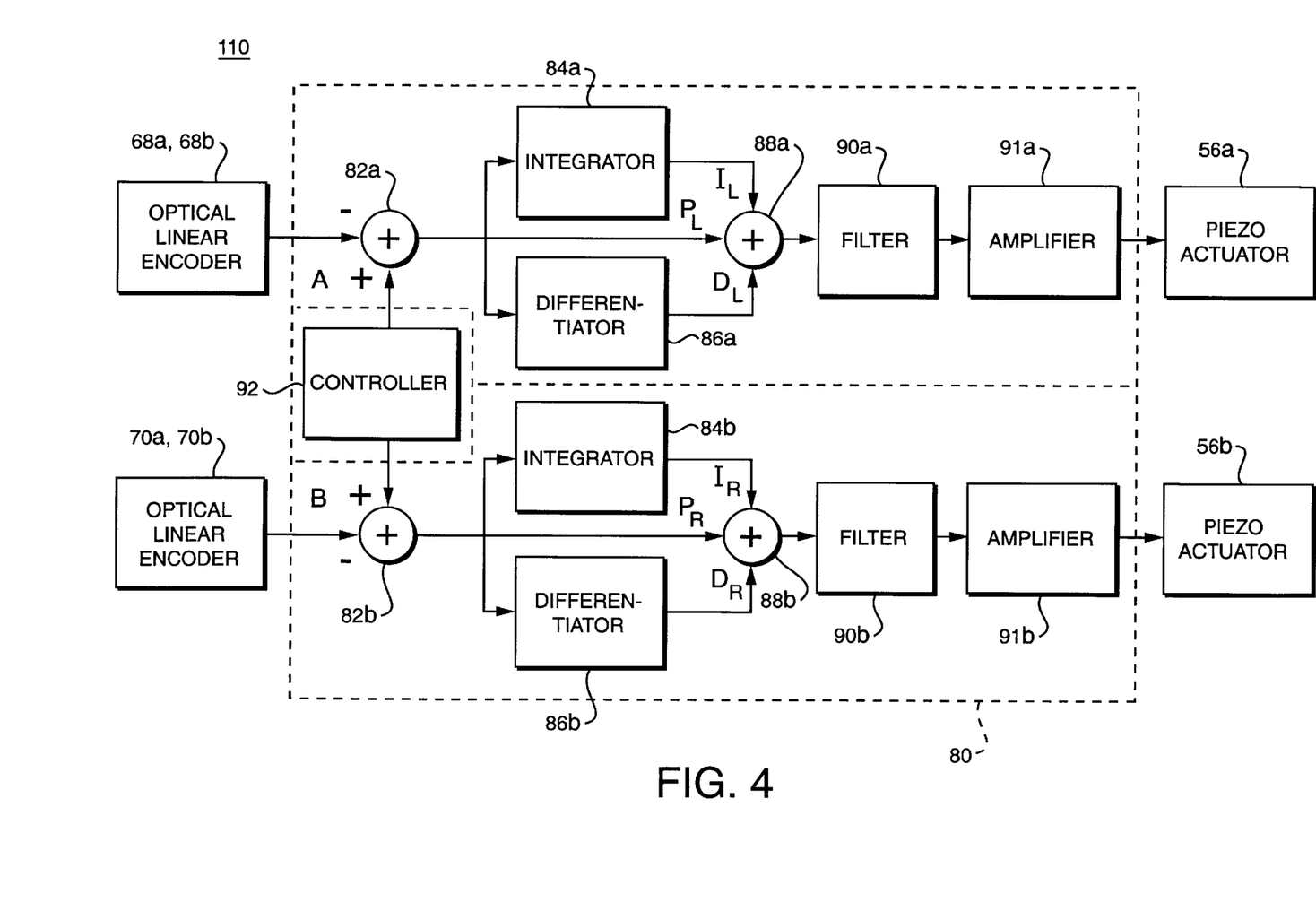
FIG. 4 is a functional block diagram of the closed-loop control system used in the magnetic head and disk tester of FIGS. 3Aa and 3B.

The positioning process is split into steps of coarse and fine positioning in order to achieve high accuracy in linear positioning of magnetic head 12 with respect to magnetic disk 10. The coarse position is effected by stepper motor 28 as it rotates lead screw 32 and generally places the magnetic head 12 in the vicinity of magnetic disk 10. Rotational movement of lead screw 32 within nut 34 is translated into a linear movement of carriage 18 to accomplish this coarse positioning. Upon completion of coarse positioning, the fine positioner is activated by applying control voltages to piezo actuators 56a and 56b. These control voltages are produced by a feed back system 110, that includes a closed-loop control system 80, as shown in FIG. 4. The closed-loop control system 80 includes two identical portions A and B that are controlled by a controller 92. Each portion, A and B, contains two adders 82a, 88a or 82b, 88b, an integrator 84a or 84b, a differentiator 86a or 86b, a filter 90a or 90b, and an amplifier 91a or 91b. Controller 92 prescribes a predetermined command position (e.g., a position $X_0$) to both parts A and B of the closed-loop control system 80. Once the left and right sides of top link 16a are positioned in accordance with the command position, any previously experienced yaw in the top element is substantially eliminated.

Part A of the closed-loop control system 80 receives a signal representative of the linear displacement or position of the left side of top element 16a from the left optical linear encoder 68a, 68b. The position of the left optical detector 68b with respect to left glass scale 68a is compared with the command position $X_0$ in adder 82a. The adder 82a calculates the difference between the command position and the detected position, referred to as the "left positioning error $P_L$". This left positioning error is integrated by integrator 84a, and is differentiated by differentiator 86a. Adder 88a calculates the weighted sum of the positioning error, its integral $I_L$, and its derivative $D_L$. The output signal of adder 88a is filtered by filter 90a (e.g., a low-pass filter) and amplified by amplifier 91a, which drives left piezo actuator 56a. As a result, piezo actuator 56a moves the left side 72 of the top link 16a of deformable body 16 in the direction opposite to the positioning error, i.e., to the command position $X_0$.

Part B of the closed-loop control system 80 gets positioning information from the right optical linear encoder 70a, 70b. In a manner similar to that described with respect to part A, part B generates a control signal for the right piezo actuator 56b using two adders 82b and 88b, integrator 84b, differentiator 86b, filter 90b, and amplifier 91a. Accordingly, a right positioning error $P_R$, integral $I_R$, and derivative $D_R$ are determined to produce the control signal. This control signal is a function of the difference between command position $X_0$ and detected position of the right optical detector 70b with respect to right glass scale 70a. As a result, piezo actuator 58a moves the right side 74 of the top link 16a of deformable body 16 in the direction opposite to the positioning error $P_R$ (for right side 74), i.e., to the command position $X_0$.

As a result of the above-described closed-loop positioning, the positions of both the left side 72 and the right side 74 of link 16a of deformable body 16 are substantially the same (i.e., $X_0$) along the X-axis at the end of any movement. Accordingly, the angle α between a horizontal axis which passes between the axis of shaft 25 and magnetic head 12 and the X-axis of linear horizontal movement (FIG. 3A) remains the same in the end of any movement (when head testing will be performed). Therefore, positioning errors associated with yaw are eliminated.

Another advantage of the tester of the present invention is that the fine positioner actively damps oscillations of deformable body 16, arm 14, and magnetic head 12 in the yaw direction during a positioning process, wherein the actuators 56a and 56b iteratively adjust for yaw and thereby control oscillations. This improvement in the dynamic characteristics of the tester results in shorter settling times, which corresponds to more efficient and effective testing.

In another embodiment, feedback from both the left and the right optical linear encoders 68a, 68b and 70a, 70b can be used to control each of two piezo actuators 56a and 56b instead of feedback from only the linear encoder on the same side as the piezo actuator. For example, weighted sums $a_{11}X_L + a_{12}X_R$ and $a_{21}X_L + a_{22}X_R$ can be used as inputs of adders 82a and 82b, respectively, where $X_L$ and $X_R$ are detected positions of the left side 72 and the right side 74 of the top link 16a of deformable body 16, $a_{11}$, $a_{12}$, $a_{21}$ and $a_{22}$ are weighting coefficients related to alignment of the encoders with the piezo actuators. The preferred embodiment described above is a special case of this equation, where $a_{11}=a_{22}=1$ and $a_{12}=a_{21}=0$. Non-zero values for weighting coefficients $a_{12}$ and $a_{21}$ can improve dynamic characteristics of the tester in the case where the axes of piezo actuators 56a and 56b do not coincide with the axes of optical linear encoders 68a, 68b and 70a, 70b, for example actuators could be placed on the right or left side of link 16a of deformable body 16, or some combination thereof. Also, the present invention could be used with other types of actuators.

The invention may be embodied in other specific forms without departing from the spirit or central characteristics thereof. For example, a head stack with many magnetic heads and a disk pack can be used instead of the single magnetic head and the single magnetic disk. Additionally, rather than a dual-stage positioning system, a positioning system having only one or more than two positioning stages could also be used, so long as at least one stage is capable of performing fine positioning. As an example, the coarse positioner could take a variety of forms, such as a belt driven (rather than screw driven) positioner, and the fine positioner need not be displaced by a piezoelectric device. The carriage could alternatively be placed on one or more rollers or bearings, instead of rails and displaced by gears, pistons, belts or similar devices. Also, the bottom link of the deformable body could be integral with the carriage and the deformable body could take a form other than a parallelogram-structured deformable body, so long as the fine positioner maintains movement of the magnetic head substantially in the second plane. The present embodiments are, therefore, to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A magnetic head and disk tester, comprising:
   a. a base having a support assembly which rotatably supports a magnetic disk in a first plane;
   b. a magnetic head that is movable with respect to the magnetic disk along a translation axis which is parallel to the first plane;
   c. a positioner, which positions the magnetic head along said translation axis relative to said base to a predetermined position with respect to the magnetic disk, the positioner comprising:
      i. a head support assembly which is moveable along said translation axis in response to a translation force applied relative to said base by a linear actuator, wherein the magnetic head is secured to the head support assembly;
      ii. an orientation detector which generates a yaw signal representative of yaw of said head support assembly in a second plane, which is parallel to said first plane, about a yaw axis that is orthogonal to the translation axis, and;
      iii. a yaw correction mechanism in operative response to said yaw signal which selectively rotationally displaces said head support assembly within the second plane until the magnetic head is substantially positioned at said predetermined position.

2. The magnetic head and disk tester of claim 1 wherein the linear actuator includes:
   a. a motor on said base and operatively controlled by a control system;
   b. a lead screw which is disposed in the direction of said translation axis and is selectively rotated by said motor; and
   c. a nut which is fixedly fastened to said head support assembly and within which the lead screw is rotatably mounted such that rotation of the lead screw causes linear displacement of the head support assembly along the translation axis.

3. The magnetic head and disk tester of claim 1, wherein the head support assembly includes:
   a. a carriage which is movable in the direction of the translation axis;
   b. a fine positioner affixed to said carriage and having a link movable along the translation axis relative to said carriage; and
   c. an arm secured to said fine positioner and to which said magnetic head is mounted, wherein the magnetic head moves in response to the movement of fine positioner along said translation axis.

4. The magnetic head and disk tester of claim 3, wherein the fine positioner is a deformable body, wherein deformation of the deformable body causes movement of said arm.

5. The magnetic head and disk tester of claim 4, wherein the deformable body is a four link parallelogram-structured deformable body having:
   a. a bottom link secured to said carriage; and
   b. a top link to which the arm is secured and which is movable along said translation axis and relative to said bottom link, wherein said top link remains substantially parallel to the bottom link throughout its movement.

6. The magnetic head and disk tester of claim 5, wherein the top link includes a left side and a right side which are mutually offset in a direction transverse to the translation axis, and wherein the orientation detector includes:
   a. a first encoder secured to the right side of said top link and movable along a first axis, which is parallel to the translation axis, in response to movement of said top link; and
   b. a first detector, which is fixed in position relative to the movement of said first encoder and in operative communication with the first encoder to generate a first signal representative of the displacement of the first side of said top link along the first axis and wherein transmits the first displacement signal to the control system.

7. The magnetic head and disk tester of claim 6, wherein the first encoder is an optical linear encoder and the first detector is an optical detector.

8. The magnetic head and disk tester of claim 6, wherein the orientation detector further includes:
   c. a second encoder secured to the left side of said top link and movable along a second axis, which is parallel to the translation axis, in response to movement of said top link; and
   d. a second detector, which is fixed in position relative to the movement of said second encoder and in operative communication with the second encoder to generate a second signal representative of the displacement of the left side of said top link along the second axis and transmits the second displacement signal to the control system.

9. The magnetic head and disk tester of claim 8, wherein the second encoder is an optical linear encoder and the second detector is an optical detector.

10. The magnetic head and disk tester of claim 1, wherein the yaw correction mechanism includes:
   a. a first displacer, under independent control by the control system and in operative communication with a first side of the head support assembly and which selectively displaces said head support assembly about the yaw axis and within the second plane in response to said first signal.

11. The magnetic head and disk tester of claim 10, wherein the first displacer is a first actuator.

12. The magnetic head and disk tester of claim 11, wherein the first actuator is a first piezoelectric actuator.

13. The magnetic head and disk tester of claim 10, wherein the yaw correction mechanism further includes:
   b. a second displacer, under independent control by the control system and in operative communication with a second side of the head support assembly and which selectively displaces said head support assembly about the yaw axis and within the second plane in response to said second signal.

14. The magnetic head and disk tester of claim 13, wherein the second displacer is a second actuator.

15. The magnetic head and disk tester of claim 14, wherein the second actuator is a second piezoelectric actuator.

16. The magnetic head and disk tester of claim 1, wherein the control system is a closed loop control system.

17. A magnetic head and disk tester comprising:
   A. a base including a disk support assembly for rotatably supporting a magnetic disk in a reference plane;
   B. a head support assembly for supporting a magnetic head at a predetermined position relative to said magnetic disk, said head support assembly including:
      i. a carriage disposed on said base and adapted for sliding motion along a reference axis parallel to said reference plane, and an associated linear actuator for selectively positioning said carriage with respect to said base along said reference axis;
      ii. a deformable body disposed on said carriage, and having one side affixed to said carriage and an opposite side being moveable with respect to said carriage along an axis parallel to said reference axis;
      iii a coupler for fixedly coupling said head to said opposite side of said deformable body;
      iv. a first drive element positioned between a first point on said opposite side and said carriage for selectively applying a first force to said opposite side relative to said carriage in the direction of said reference axis; and
      v. a second drive element positioned between a second point on said opposite side and said carriage for selectively applying a second force to said opposite side relative to said carriage in the direction of said reference axis;
   wherein said first and second points are mutually offset in a direction transverse to said reference axis.

18. A tester according to claim 17 further comprising a detector for generating a signal representative of the angular orientation of said opposite side of said deformable body about an axis perpendicular to said reference plane.

19. A tester according to claim 18 further comprising a feedback network responsive to said angular orientation signal and a signal representative of said predetermined position to drive said magnetic head to said predetermined position with respect to said magnetic disk.

20. A tester according to claim 17 wherein said first drive element and said second drive element are piezo actuators.

21. A magnetic head and disk tester for testing at least one magnetic head together with at least one magnetic disk, said tester comprising:
   a. a stationary base and means on said stationary base for supporting and rotating said magnetic disk;
   b. a mechanism for rough positioning of said magnetic head with respect to said magnetic disk, said mechanism comprising a slide moveable with respect to said stationary base, and a first drive means for linearly moving said slide with respect to said stationary base; and
   c. a mechanism for fine positioning of said magnetic head with respect to said magnetic disk, said mechanism further comprising:
      i. a deformable body that is rigidly attached to said slide, said deformable body being made substantially in the form of a parallelepiped, said parallelepiped having a top plate rigidly supporting said magnetic head, and a bottom plate rigidly attached to said slide, said top plate having a left side and a right side;
      ii. a second drive means that is installed between said left side of said top plate of said deformable body and a stop that is stationary with respect to said slide, said second drive means being used to move said left side of said top plate of said deformable body in the same direction as said first drive means;
      iii. a third drive means that is installed between said right side of said top plate of said deformable body and a stop that is stationary with respect to said slide, said third drive means being used to move said right side of said top plate of said deformable body in the same direction as said first drive means; and
      iv. a means for measuring the position of said left side and said right side of said top plate of said deformable body.

22. The magnetic head and disk tester of claim 21 wherein said first drive means comprises a stepper motor attached to said stationary base, a lead screw rotatably by said stepper motor, and a nut fixed to said slide.

23. The magnetic head and disk tester of claim 21 wherein said means for measuring said position of said left side and said right side of said top plate of said deformable body comprises two optical linear encoders.

24. The magnetic head and disk tester of claim 21, wherein said second and said third drive means each comprises a piezo actuator.

25. The magnetic head and disk tester of claim 21, wherein a closed-loop system is used to control the positions of said left side and said right side of said top plate of said deformable body.

26. The magnetic head and disk tester of claim 25, wherein said closed-loop system consists of two independent subsystems controlling said second drive means using said means for measuring the position of said left side of said top plate of said deformable body, the other said subsystem controlling said third drive means using said means for measuring the position of said right side of said top plate of said deformable body.

27. The magnetic head and disk tester of claim 25, wherein said closed-loop system consists of two independent subsystems, each said subsystem controlling the corresponding drive means using a weighted sum of readouts of both said means for measuring the position of said left side and said right side of said top plate of said deformable body.

* * * * *